(12) United States Patent
Alvarez et al.

(10) Patent No.: US 8,540,208 B2
(45) Date of Patent: Sep. 24, 2013

(54) BISTABLE VALVE

(75) Inventors: Raphael Alvarez, Geneva (CH); Pierre Sirdey, Geneva (CH)

(73) Assignee: Fluid Automation Systems S.A., Versoix (CH)

( * ) Notice: Subject to any disclaimer, the term of this patent is extended or adjusted under 35 U.S.C. 154(b) by 463 days.

(21) Appl. No.: 12/377,707

(22) PCT Filed: Sep. 7, 2006

(86) PCT No.: PCT/EP2006/008748
§ 371 (c)(1),
(2), (4) Date: Feb. 17, 2009

(87) PCT Pub. No.: WO2008/028509
PCT Pub. Date: Mar. 13, 2008

(65) Prior Publication Data
US 2010/0163766 A1    Jul. 1, 2010

(51) Int. Cl.
*F16K 31/08* (2006.01)
*F16K 31/10* (2006.01)
*F16K 31/02* (2006.01)

(52) U.S. Cl.
USPC .............. 251/65; 251/129.15; 251/129.21; 137/625.65

(58) Field of Classification Search
USPC ............... 251/65, 129.15, 129.21, 129.02; 137/625.65
See application file for complete search history.

(56) References Cited

U.S. PATENT DOCUMENTS

| | | | |
|---|---|---|---|
| 2,869,563 A * | 1/1959 | Schoengrun | 137/43 |
| 3,420,492 A | 1/1969 | Ray | |
| 3,977,436 A | 8/1976 | Larner | |
| 4,072,918 A * | 2/1978 | Read, Jr. | 335/236 |
| 4,114,648 A | 9/1978 | Nakajima et al. | |
| 4,299,252 A | 11/1981 | Reinicke | |
| 4,392,632 A | 7/1983 | Gast et al. | |
| 4,538,129 A * | 8/1985 | Fisher | 335/230 |
| 4,605,197 A * | 8/1986 | Casey et al. | 251/30.01 |

(Continued)

FOREIGN PATENT DOCUMENTS

GB    2003586 A    3/1979

OTHER PUBLICATIONS

Magnetization Patterns [online]. Yuxiang Magnetic Materials Ind Co Ltd., 2001 [retrieved on Jan. 23, 2012]. Retrieved from the Internet: <URL: http://www.magnets.com.cn/in2jj-2e.htm>.*

(Continued)

*Primary Examiner* — John Rivell
*Assistant Examiner* — Jonathan Waddy
(74) *Attorney, Agent, or Firm* — The Ollila Law Group LLC

(57) ABSTRACT

A bistable valve (100) is provided according to an embodiment of the invention. The bistable valve (100) includes an armature (108) movable to selectively block and unblock at least a first port (104) and a biasing device (112) configured to provide a first biasing force that biases the armature (108) toward a first position blocking the first port (104). The bistable valve (100) further includes a plurality of substantially radially magnetized permanent magnets (114) configured to provide a second biasing force to the armature (108) substantially opposite to the first biasing force and an electromagnetic coil (116) configured to generate a third biasing force when energized with a first current polarity. The third biasing force is substantially opposite to the first biasing force and in combination with the second biasing force overcomes the first biasing force and moves the armature (108).

26 Claims, 5 Drawing Sheets

(56) References Cited

U.S. PATENT DOCUMENTS

| | | | |
|---|---|---|---|
| 4,621,660 A | | 11/1986 | Klocke |
| 4,660,011 A | | 4/1987 | Reiter |
| 4,683,452 A | * | 7/1987 | Henley ............................ 335/234 |
| 4,794,890 A | | 1/1989 | Richeson, Jr. |
| 4,946,009 A | | 8/1990 | Knutson |
| 5,010,911 A | * | 4/1991 | Grant .............................. 251/65 |
| 5,029,807 A | * | 7/1991 | Fuchs .............................. 251/65 |
| 5,129,620 A | | 7/1992 | Castetter |
| 5,249,603 A | | 10/1993 | Byers, Jr. |
| 5,265,842 A | * | 11/1993 | Sorah et al. .............. 251/129.08 |
| 5,318,071 A | | 6/1994 | Gaiardo |
| 5,356,111 A | * | 10/1994 | Bottacini ................. 251/129.15 |
| 5,497,135 A | | 3/1996 | Wisskirchen et al. |
| 5,971,356 A | | 10/1999 | Offenwanger et al. |
| 6,158,713 A | | 12/2000 | Ohya et al. |
| 6,274,954 B1 | | 8/2001 | Gander et al. |
| 6,386,505 B2 | * | 5/2002 | Schob ................................ 251/7 |
| 6,820,651 B2 | | 11/2004 | Seuret et al. |
| 6,899,314 B2 | | 5/2005 | Ott |
| 6,975,195 B2 | | 12/2005 | Rausch et al. |
| 2004/0051064 A1 | * | 3/2004 | Beraldo ..................... 251/30.03 |
| 2005/0211200 A1 | | 9/2005 | Liang et al. |

OTHER PUBLICATIONS

How Magnets Work [online]. How Stuff Works [retrieved on Jan. 23, 2012]. Retrieved from the Internet: <URL: http://science.howstuffworks.com/magnet.htm>.*

Magnets [online]. Wikipedia, 2012 [retrieved on Jan. 23, 2012]. Retrieved from the Internet: <URL: http://en.wikipedia.org/wiki/Magnets>.*

Experiments with magnets and our surroundings [online]. Magnet Man, 2011 [retrieved on Jan. 23, 2012]. Retrieved from the Internet: <URL: http://www.coolmagnetman.com/field01.htm>.*

Helmholtz Association of German Research Centres. Magnetic Monopoles Detected in a Real Magnet for the First Time. ScienceDaily [online], [retrieved on Jun. 28, 2012]. Retrieved from the internet <URL: http://www.sciencedaily.com/releases/2009/09/090903163725.htm>.*

* cited by examiner

BISTABLE VALVE

BACKGROUND OF THE INVENTION

1. Field of the Invention

The present invention relates to a bistable valve.

2. Statement of the Problem

A valve comprises a valve body containing a valve mechanism. Inlet and outlet ports communicate between the valve mechanism and the outside world. The valve mechanism can move in the valve body and can selectively contact and unblock the one or more valve seats in order to perform the valve function, thereby selecting and deselecting ports.

One difficulty in valve design is in producing a reliable bistable valve, wherein the valve mechanism moves between two valve positions. One type of bistable valve employs an electromagnet (i.e., solenoid) that actuates the valve mechanism between the two positions. The valve mechanism should stay in its current position in the absence of actuation. In addition, the valve mechanism should stay in a current position without continuous or further application of electrical power. However, the valve mechanism should be able to be actuated to either position without an excessive power requirement.

SUMMARY OF THE INVENTION

A bistable valve is provided according to an embodiment of the invention. The bistable valve comprises an armature movable to selectively block and unblock at least a first port. The bistable valve further comprises a biasing device configured to provide a first biasing force to the armature, with the biasing device biasing the armature toward a first position blocking the first port. The bistable valve further comprises a plurality of permanent magnets configured to provide a second biasing force to the armature substantially opposite to the first biasing force and an electromagnetic coil configured to generate a third biasing force when energized with a first current polarity. A magnet of the plurality of permanent magnets is substantially radially magnetized. The third biasing force is substantially opposite to the first biasing force, wherein the third biasing force in combination with the second biasing force overcomes the first biasing force and moves the armature to unblock the first port.

A bistable valve is provided according to an embodiment of the invention. The bistable valve comprises an armature movable to selectively block and unblock a first port and correspondingly unblock and block a third port. The bistable valve further comprises a biasing device configured to provide a first biasing force to the armature, with the biasing device biasing the armature toward a first position blocking the first port. The bistable valve further comprises a plurality of permanent magnets configured to provide a second biasing force to the armature substantially opposite to the first biasing force and an electromagnetic coil configured to generate a third biasing force when energized with a first current polarity. The third biasing force is substantially opposite to the first biasing force, wherein the third biasing force in combination with the second biasing force overcomes the first biasing force and moves the armature to unblock the first port and to block the third port. The bistable valve further comprises a conduit extending substantially centrally through the electromagnetic coil and substantially centrally through the plurality of permanent magnets.

A method of actuating an armature of a bistable valve is provided according to an embodiment of the invention. The method comprises biasing the armature toward a first position with a first biasing force supplied by a biasing device. The armature blocks at least a first port in the first position. The method further comprises biasing the armature toward a second position with a second biasing force supplied by a plurality of permanent magnets. The second biasing force is substantially opposite to the first biasing force. A magnet of the plurality of permanent magnets is substantially radially magnetized. The method further comprises energizing an electromagnetic coil with a first current polarity that generates a third biasing force. The third biasing force is substantially opposite to the first biasing force. The third biasing force in combination with the second biasing force overcomes the first biasing force and moves the armature to unblock the first port.

ASPECTS OF THE INVENTION

In one embodiment of the bistable valve, the plurality of permanent magnets do not add a gap in a magnetic circuit of the bistable valve.

In another embodiment of the bistable valve, the bistable valve further comprises a conduit extending substantially centrally through the electromagnetic coil and substantially centrally through the plurality of permanent magnets.

In yet another embodiment of the bistable valve, a permanent magnet of the plurality of permanent magnets is substantially radially magnetized.

In yet another embodiment of the bistable valve, a permanent magnet of the plurality of permanent magnets comprises a substantially parallelepiped shape.

In yet another embodiment of the bistable valve, the plurality of permanent magnets are substantially annularly arranged around a central axis of the bistable valve.

In yet another embodiment of the bistable valve, the electromagnetic coil comprises a substantially hollow cylinder and the plurality of permanent magnets are substantially coaxial with the electromagnetic coil.

In yet another embodiment of the bistable valve, the plurality of permanent magnets and the electromagnetic coil are contained at least partially within a holder.

In yet another embodiment of the bistable valve, the armature is formed of a substantially ferromagnetic material.

In yet another embodiment of the bistable valve, the armature includes a poppet seal member.

In yet another embodiment of the bistable valve, the electromagnetic coil is further configured to be energized by a second current polarity that generates a fourth biasing force, with the fourth biasing force being substantially opposite to the second biasing force of the plurality of permanent magnets and substantially in alignment with the first biasing force of the biasing device, wherein the fourth biasing force in combination with the first biasing force overcomes the second biasing force and moves the armature to unblock a third port and to block the first port.

In one embodiment of the method, the plurality of permanent magnets do not add a gap in a magnetic circuit of the bistable valve.

In another embodiment of the method, the bistable valve further comprises a conduit extending substantially centrally through the electromagnetic coil and substantially centrally through the plurality of permanent magnets.

In yet another embodiment of the method, a permanent magnet of the plurality of permanent magnets comprises a substantially parallelepiped shape.

In yet another embodiment of the method, the plurality of permanent magnets are substantially annularly arranged around a central axis of the bistable valve.

In yet another embodiment of the method, the electromagnetic coil comprises a substantially hollow cylinder and the plurality of permanent magnets are substantially coaxial with the electromagnetic coil.

In yet another embodiment of the method, the plurality of permanent magnets and the electromagnetic coil are contained at least partially within a holder.

In yet another embodiment of the method, the armature is formed of a substantially ferromagnetic material.

In yet another embodiment of the method, the armature includes a poppet, seal member.

In yet another embodiment of the method, the method further comprises energizing the electromagnetic coil with a second current polarity that generates a fourth biasing force, with the fourth biasing force being substantially opposite to the second biasing force of the plurality of permanent magnets and substantially in alignment with the first biasing force of the biasing device, wherein the fourth biasing force in combination with the first biasing force overcomes the second biasing force and moves the armature to unblock a third port and to block the first port.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
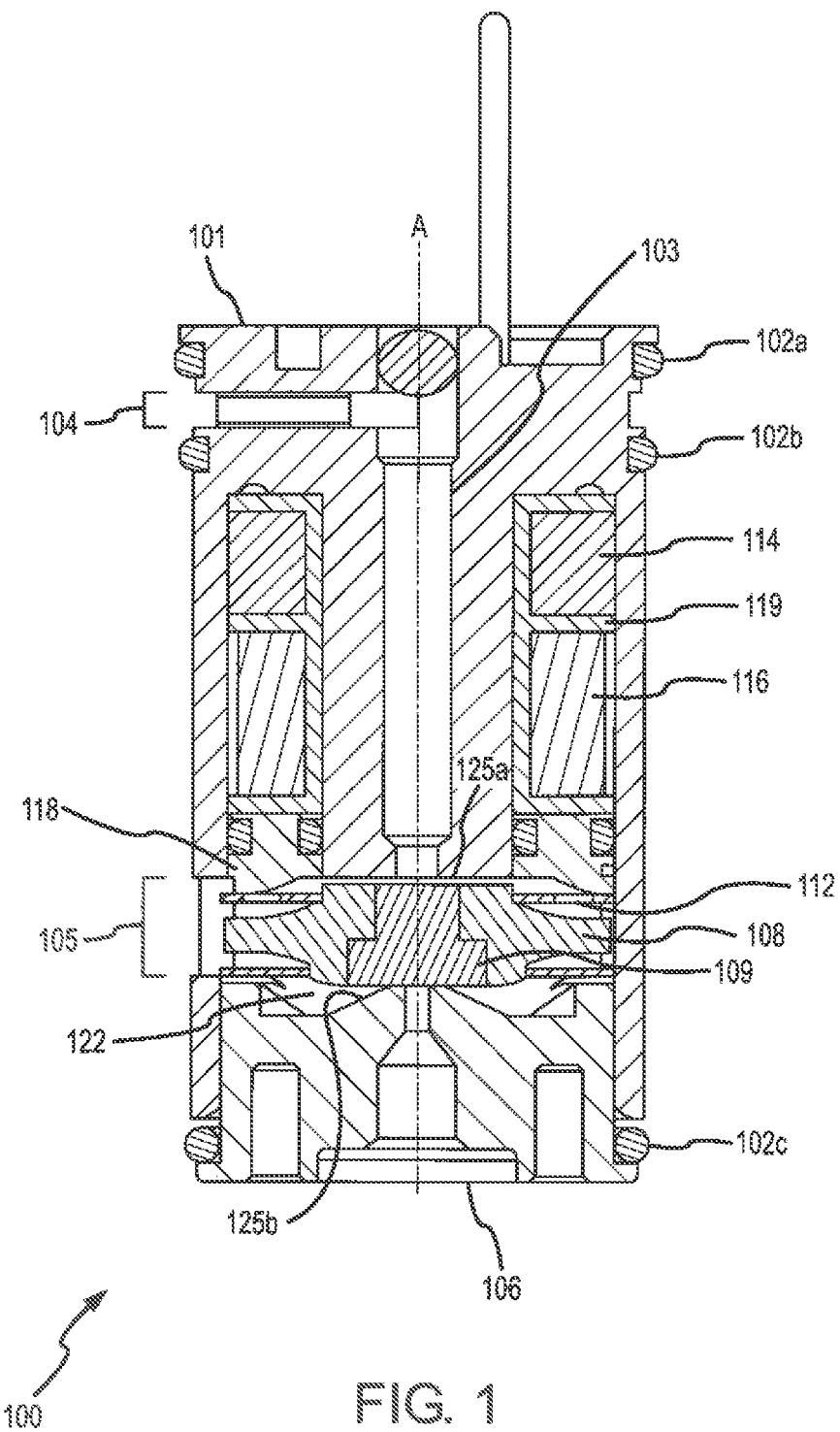
FIG. 1 is a cross-sectional view of a bistable valve according to an embodiment of the invention.

FIG. 1 is a cross-sectional view of a bistable valve 100 according to an embodiment of the invention. The bistable valve 100 includes a body 101 including seals 102a-102c, a conduit 103, a first port 104, a second port 105, a third port 106, an armature 108 including a poppet seal member 109, a biasing device 112, a plurality of permanent magnets 114, an electromagnetic coil 116, and an insert 118. The plurality of permanent magnets 114 and the electromagnetic coil 116 are contained at least partially within a holder 119 within the body 101. The holder 119 can comprise a plastic bobbin, for example.

The seals 102a, 102b, and 102c demarcate the first port 104 and the second port 105, respectively. Consequently, the bistable valve 100 can be inserted into and can seal to a receptacle or chamber that includes conduits corresponding to the regions between the seals 102a, 102b, and 102c.

The body 101 includes a chamber 122 that communicates with the second port 105. The chamber 122 includes an upper valve seat 125a in communication with the conduit 103, which is further in communication with the first port 104. The chamber 122 further includes a lower valve seat 125b that communicates with the third port 106. The armature 108 can move in the chamber 122 and can move into sealing contact with either the upper valve seat 125a or the lower valve seat 125b. Consequently, the armature 108 can place the second port 105 into communication with either the first port 104 or the third port 106.

The armature 108 can be formed of a ferromagnetic material. Consequently, the armature 108 can be magnetically moved upward or downward in the chamber 122. The armature 108 in some embodiments can include the poppet seal member 109. The poppet seal member 109 can be formed of an at least partially compressible material in order to seal a valve seat 125 when the valve seat 125 is contacted by the armature 108. The poppet seal member 109 in some embodiments can seal to the upper valve seat 125a and the lower valve seat 125b, as shown.

The biasing device 112 in the embodiment shown is positioned between the upper region of the armature 108 and the upper surface of the chamber 122. The biasing device 112 places a first biasing force on the armature 108 that urges the armature 108 toward a first position and into sealing contact with the lower valve seat 125b. In the figure, the armature 108 is at the first position.

The plurality of permanent magnets 114 are radially spaced about the conduit 103. Any number of permanent magnets 114 can be used, and of any size. In one embodiment, the magnets of the plurality of permanent magnets 114 are substantially radially magnetized (see FIGS. 2-3 and the accompanying discussion). The plurality of permanent magnets 114 generate a magnetic field that is conducted through at least a portion of the body 101 and through at least a portion of the armature 108. The magnets of the plurality of permanent magnets 114 do not add a gap in this magnetic circuit.

The plurality of permanent magnets 114 therefore generate a second biasing force on the armature 108 that is directed upwardly in the figure and substantially aligned with a central axis of the bistable valve 100. The second biasing force generated by the plurality of permanent magnets 114 is substantially opposite to the first biasing force generated by the biasing device 112. The second biasing force of the plurality of permanent magnets 114 urges the armature 108 toward a second position and into sealing contact with the upper valve seat 125a.

The second biasing force in some embodiments is smaller than the first biasing force when the armature 108 is in contact with the lower valve seat 125a, i.e., as in the first position. In the first position, the biasing device 112 is not substantially deformed and generates a first biasing force. In addition, in the first position the plurality of permanent magnets 114 generate a smaller second biasing force than when the armature 108 is in the second position, closer to the plurality of permanent magnets 114. As a result, in the first position the first biasing force generated by the biasing device 112 is larger than the second biasing force generated by the plurality of permanent magnets 114. Consequently, the armature 108 stays in the first position, absent any other forces.

When the armature 108 is in the second position sealing the upper valve seat 125a, the first biasing force is relatively weak and the second biasing force is comparatively strong. As a result, the plurality of permanent magnets 114 is sufficient to hold the armature 108 at the second position, absent any other forces.

Because of the bistable nature of the armature 108, as discussed above, the electromagnetic coil 116 is included in order to provide actuation of the armature 108. The electromagnetic coil 116 generates a magnetic field when energized by an electrical current. The electromagnetic coil 116 can comprise a substantially hollow cylinder and can generate a substantially axially symmetric magnetic field. The electromagnetic coil 116 can be actuated using two electrical current polarities to create two opposite magnetic forces.

When energized by a first electrical current, the electromagnetic coil 116 generates a third biasing force directed upwardly in the figure. The third biasing force is substantially opposite to the first biasing force of the biasing device 112 and is substantially aligned with the second biasing force of the plurality of permanent magnets 114. As a result, when the electromagnetic coil 116 is energized by the first electrical current, the third biasing force is added to the second biasing force. Together, these two biasing forces overcome the first biasing force and move the armature 108 away from the lower valve seat 125b, towards the second position and into sealing contact with the upper valve seat 125a.

When the electromagnetic coil 116 is energized by a second electrical current that is opposite in polarity to the first electrical current, the electromagnetic coil 116 generates a fourth biasing force. The fourth biasing force is substantially aligned with the first biasing force and is substantially opposite to the second biasing force. The fourth biasing force, in combination with the first biasing force, overcomes the second biasing force and moves the armature 108 away from the second position and back to the first position into sealing contact with the lower valve seat 125b.

Figure 2:
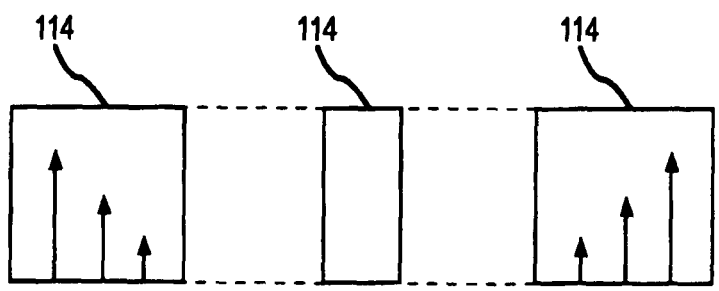
FIG. 2 shows a magnetization pattern of a plurality of permanent magnets of the bistable valve according to an embodiment of the invention.

FIG. 2 shows a magnetization pattern of the plurality of permanent magnets 114 of the bistable valve 100 according to an embodiment of the invention. In this figure, the plurality of permanent magnets 114 are radially inwardly magnetized, wherein the outer surfaces of the plurality of permanent magnets 114 have greater levels of magnetization than the inner surfaces. This magnetization pattern can be generated by placing a magnetic flux source around the exterior of the plurality of permanent magnets 114.

Figure 3:
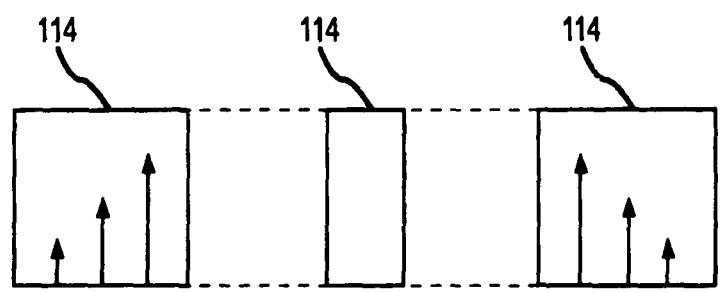
FIG. 3 shows a magnetization pattern of the plurality of permanent magnets of the bistable valve according to an embodiment of the invention.

FIG. 3 shows a magnetization pattern of the plurality of permanent magnets 114 of the bistable valve 100 according to an embodiment of the invention. In this figure, the plurality of permanent magnets 114 are radially outwardly magnetized, wherein the inner surfaces of the plurality of permanent magnets 114 have greater levels of magnetization than the outer surfaces. This magnetization pattern can be generated by placing a magnetic flux source within the conduit 103.

Figure 4:
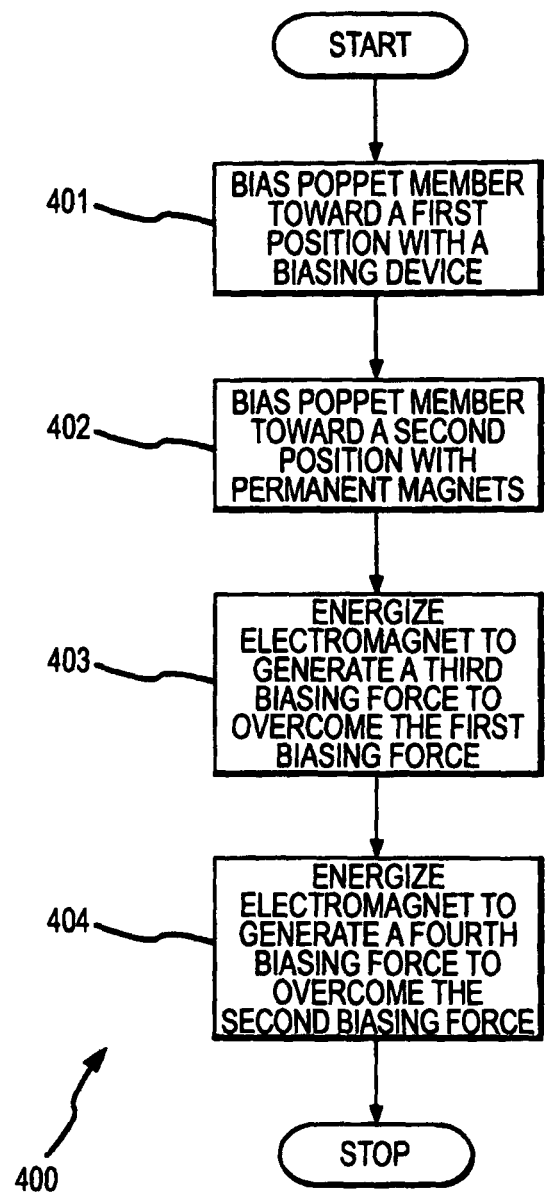
FIG. 4 is a flowchart of a method of actuating an armature of a bistable valve according to an embodiment of the invention.

FIG. 4 is a flowchart 400 of a method of actuating an armature of a bistable valve according to an embodiment of the invention. The armature of the bistable valve therefore is moved between a first position and a second position. In step 401, the armature is biased toward a first position. The biasing comprises a first biasing force exerted on the armature by a biasing device. The first position, as discussed above, can comprise a position wherein the armature is held in contact with a lower valve seat of two valve seats.

In step 402, the armature is also biased toward the second position, using a plurality of permanent magnets, as previously discussed. The biasing device and the plurality of permanent magnets therefore create the first and second biasing forces at the time of assembly of the bistable valve. The permanent magnets generate a second biasing force that is substantially opposite to the first biasing force. The second biasing force exists concurrently with the first biasing force. When the armature is at the first position, the first biasing force is greater than the second biasing force, as previously discussed. Conversely, when the armature is at the second position, the second biasing force is greater than the first biasing force. As a result, the armature is bistable and is retained at a current position, in the absence of any additional forces on the armature.

In step 403, in operation, an electromagnetic coil is energized with a first electrical current to generate a third biasing force. The third biasing force is substantially opposite to the first biasing force. Therefore, the combination of the third biasing force and the second biasing force overcome the first biasing force generated by the biasing device. As a result, the energization of the electromagnetic coil by the first electrical current will result in the armature moving from the first position to the second position.

It should be noted that because the valve is bistable, the electromagnetic coil does not need to be continuously energized. Instead, the electromagnetic coil can be energized only for a time period sufficient to move the armature to the second position.

In step 404, in operation, the electromagnetic coil is energized with a second electrical current that is opposite in polarity to the first electrical current. As a result, the electromagnetic coil generates a fourth biasing force. The fourth biasing force is substantially aligned with the first biasing force and is therefore substantially opposite to the second biasing force. The combination of the fourth biasing force and the first biasing force overcome the second biasing force generated by the plurality of permanent magnets. Consequently, the armature moves from the second position to the first position. Because the valve is bistable, the electromagnetic coil needs to be energized with the second electrical current only for a time period sufficient to move the armature to the first position.

Figure 5:
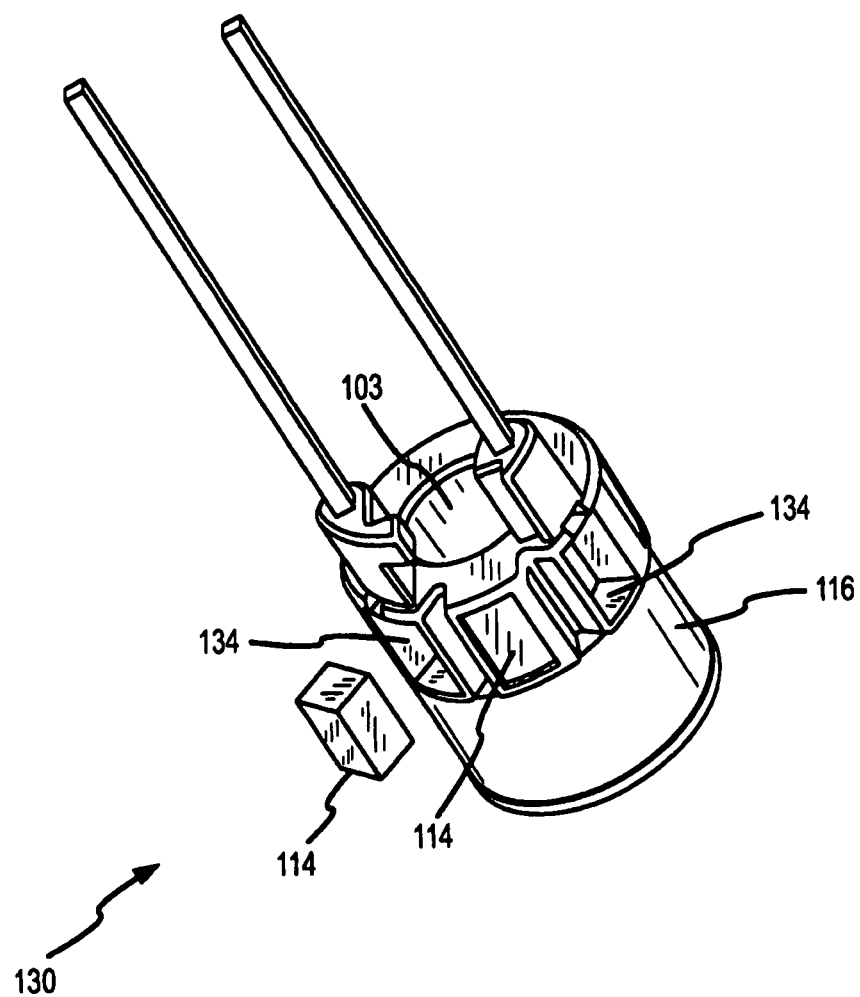
FIG. 5 shows a magnet sub-assembly of the bistable valve according to an embodiment of the invention.

FIG. 5 shows a magnet sub-assembly 130 of the bistable valve 100 according to an embodiment of the invention. This figure shows permanent magnets 114 and corresponding receptacles 134 of the magnet sub-assembly 130. The magnets 114 can be retained in the receptacles 134 in any manner. The magnets 114 can be retained in the receptacles 134 through any manner of friction or compressive fit. The magnets 114 can be retained in the receptacles 134 by use of welds, adhesives, or potting materials. The magnets 114 can be retained in the receptacles 134 by an outer casing or other portion of the body 101 of the bistable valve 100. The electromagnetic coil 116 and the plurality of permanent magnets 114 can alternatively be over-molded by the holder 119. Consequently, the electromagnetic coil 116 and the plurality of permanent magnets 114 are totally isolated from a fluid in the bistable valve. This ensures safe and reliable valve function.

The plurality of permanent magnets 114 can be magnetized before assembly into the bistable valve 100. Due to their component nature, individual permanent magnets 114 can first be magnetized and then can be later inserted into receptacles 134 of the magnet sub-assembly 130. Component magnets will reduce the cost of the bistable valve 100 and will ease the assembly process. Alternatively, the plurality of permanent magnets 114 can be magnetized after assembly. An assembly including the electromagnetic coil 116 and the plurality of permanent magnets 114 can be tested and inspected as a unit prior to a final valve assembly.

The magnets 114 in this figure comprise substantially parallelepiped shapes. However, it should be understood that a magnets 114 can comprise other shapes and other shapes are within the scope of the description and claims.

In the embodiment shown, the plurality of permanent magnets 114 and the electromagnetic coil 116 are substantially cylindrical in arrangement. The conduit 103 extends substantially centrally through the plurality of permanent magnets 114 and the electromagnetic coil 116. The magnet sub-assembly 130 can advantageously be tested before full assembly of the bistable valve 100.

Figure 6:
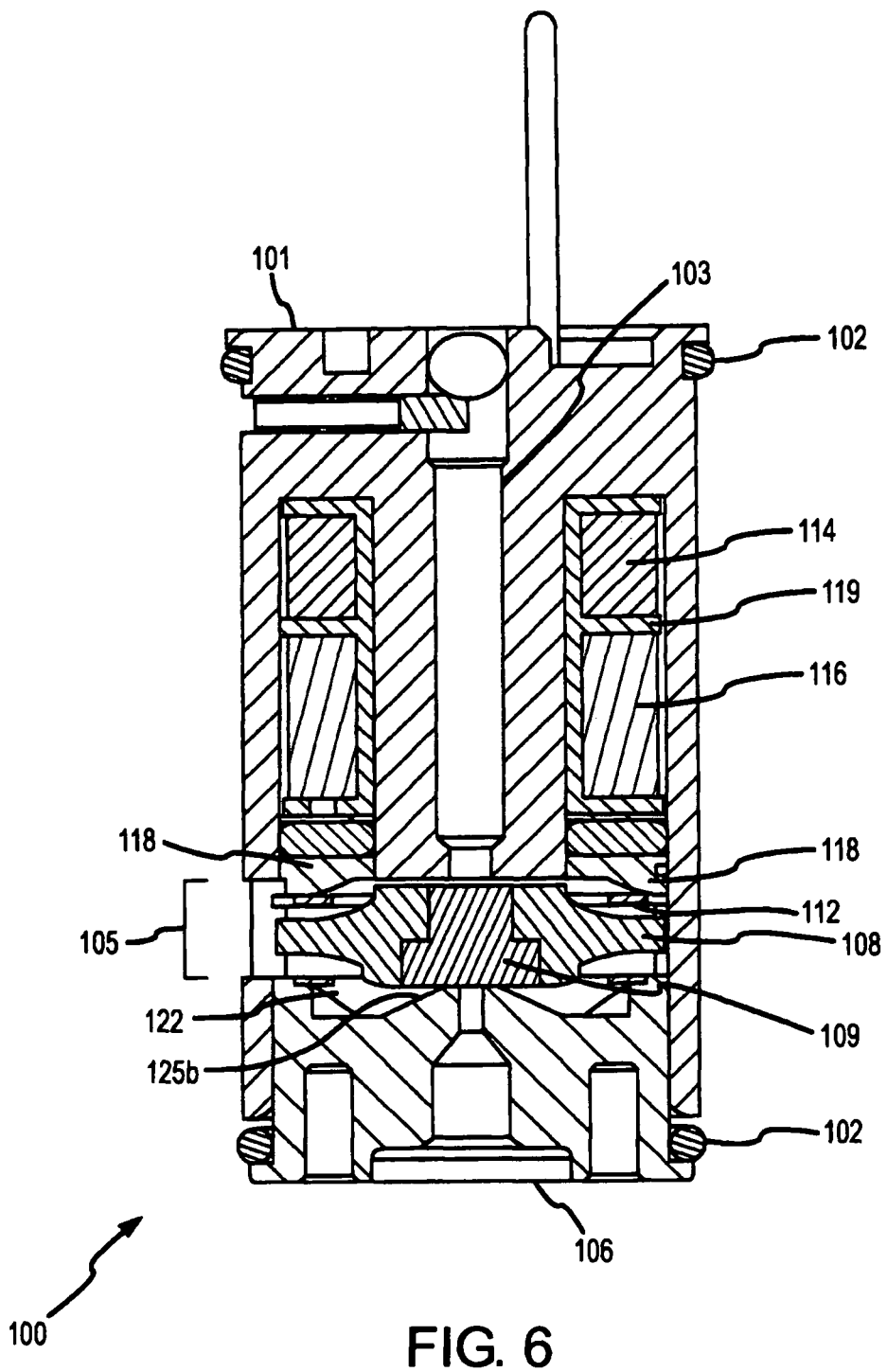
FIG. 6 is a cross-sectional view of the bistable valve according to an embodiment of the invention.

FIG. 6 is a cross-sectional view of the bistable valve 100 according to an embodiment of the invention. This figure shows a blind central conduit 103 that does not connect to the chamber 122. Consequently, the bistable valve 100 comprises a two position, two port valve.

What is claimed is:

1. A bistable valve (100), comprising:
   an armature (108) movable to selectively block and unblock at least a first port (104);
   a biasing device (112) configured to provide a first biasing force to the armature (108), with the biasing device (112) biasing the armature (108) toward a first position blocking the first port (104);
   a plurality of permanent magnets (114) substantially annularly arranged around a central axis of the bistable valve (100) and configured to provide a second biasing force to the armature (108) substantially opposite to the first biasing force, with a magnet of the plurality of permanent magnets (114) including poles that are substantially parallel in orientation with the central axis and wherein magnetic flux of the magnet changes in strength in a radial direction with respect to the central axis; and
   an electromagnetic coil (116) configured to generate a third biasing force when energized with a first current polarity, with the third biasing force being substantially opposite to the first biasing force, wherein the third biasing force in combination with the second biasing force overcomes the first biasing force and moves the armature (108) to unblock the first port (104).

2. The bistable valve (100) of claim 1, wherein the plurality of permanent magnets (114) do not add a gap in a magnetic circuit of the bistable valve (100).

3. The bistable valve (100) of claim 1, further comprising a conduit (103) extending substantially centrally through the electromagnetic coil (116) and substantially centrally through the plurality of permanent magnets (114).

4. The bistable valve (100) of claim 1, with a permanent magnet of the plurality of permanent magnets (114) comprising a substantially parallelepiped shape.

5. The bistable valve (100) of claim 1, with the electromagnetic coil (116) comprising a substantially hollow cylinder and with the plurality of permanent magnets (114) being substantially coaxial with the electromagnetic coil (116).

6. The bistable valve (100) of claim 1, with the plurality of permanent magnets (114) and the electromagnetic coil (116) being contained at least partially within a holder (119).

7. The bistable valve (100) of claim 1, with the armature (108) being formed of a substantially ferromagnetic material.

8. The bistable valve (100) of claim 1, with the armature (108) including a poppet seal member (109).

9. The bistable valve (100) of claim 1, with the electromagnetic coil (116) being further configured to be energized by a second current polarity that generates a fourth biasing force, with the fourth biasing force being substantially opposite to the second biasing force of the plurality of permanent magnets (114) and substantially in alignment with the first biasing force of the biasing device (112), wherein the fourth biasing force in combination with the first biasing force overcomes the second biasing force and moves the armature (108) to unblock a third port (106) and to block the first port (104).

10. A bistable valve (100), comprising:
    an armature (108) movable to selectively block and unblock a first port (104) and correspondingly unblock and block a third port (106);
    a biasing device (112) configured to provide a first biasing force to the armature (108), with the biasing device (112) biasing the armature (108) toward a first position blocking the first port (104);
    a plurality of permanent magnets (114) substantially annularly arranged around a central axis of the bistable valve (100) and configured to provide a second biasing force to the armature (108) substantially opposite to the first biasing force, with a magnet of the plurality of permanent magnets (114) including poles that are substantially parallel in orientation with the central axis and wherein magnetic flux of the magnet changes in strength in a radial direction with respect to the central axis; and
    an electromagnetic coil (116) configured to generate a third biasing force when energized with a first current polarity, with the third biasing force being substantially opposite to the first biasing force, wherein the third biasing force in combination with the second biasing force overcomes the first biasing force and moves the armature (108) to unblock the first port (104) and to block the third port (106); and
    a conduit (103) extending substantially centrally through the electromagnetic coil (116) and substantially centrally through the plurality of permanent magnets (114).

11. The bistable valve (100) of claim 10, wherein the plurality of permanent magnets (114) do not add a gap in a magnetic circuit of the bistable valve (100).

12. The bistable valve (100) of claim 10, with a permanent magnet of the plurality of permanent magnets (114) comprising a substantially parallelepiped shape.

13. The bistable valve (100) of claim 10, with the electromagnetic coil (116) comprising a substantially hollow cylinder and with the plurality of permanent magnets (114) being substantially coaxial with the electromagnetic coil (116).

14. The bistable valve (100) of claim 10, with the plurality of permanent magnets (114) and the electromagnetic coil (116) being contained at least partially within a holder (119).

15. The bistable valve (100) of claim 10, with the armature (108) being formed of a substantially ferromagnetic material.

16. The bistable valve (100) of claim 10, with the armature (108) including a poppet seal member (109).

17. The bistable valve (100) of claim 10, with the electromagnetic coil (116) being further configured to be energized by a second current polarity that generates a fourth biasing force, with the fourth biasing force being substantially opposite to the second biasing force of the plurality of permanent magnets (114) and substantially in alignment with the first biasing force of the biasing device (112), wherein the fourth biasing force in combination with the first biasing force overcomes the second biasing force and moves the armature (108) to unblock the third port (106) and to block the first port (104).

18. A method of actuating an armature of a bistable valve, the method comprising:
    biasing the armature toward a first position with a first biasing force supplied by a biasing device, with the armature blocking at least a first port in the first position;
    biasing the armature toward a second position with a second biasing force supplied by a plurality of permanent magnets substantially annularly arranged around a central axis of the bistable valve, with the second biasing force being substantially opposite to the first biasing force and with a magnet of the plurality of permanent magnets including poles that are substantially parallel in orientation with the central axis and wherein magnetic flux of the magnet changes in strength in a radial direction with respect to the central axis;

energizing an electromagnetic coil with a first current polarity that generates a third biasing force, with the third biasing force being substantially opposite to the first biasing force, wherein the third biasing force in combination with the second biasing force overcomes the first biasing force and moves the armature to unblock the first port.

19. The method of claim 18, wherein the plurality of permanent magnets do not add a gap in a magnetic circuit of the bistable valve.

20. The method of claim 18, with the bistable valve further comprising a conduit extending substantially centrally through the electromagnetic coil and substantially centrally through the plurality of permanent magnets.

21. The method of claim 18, with a permanent magnet of the plurality of permanent magnets comprising a substantially parallelepiped shape.

22. The method of claim 18, with the electromagnetic coil comprising a substantially hollow cylinder and with the plurality of permanent magnets being substantially coaxial with the electromagnetic coil.

23. The method of claim 18, with the plurality of permanent magnets and the electromagnetic coil being contained at least partially within a holder.

24. The method of claim 18, with the armature being formed of a substantially ferromagnetic material.

25. The method of claim 18, with the armature including a poppet seal member.

26. The method of claim 18, further comprising:

energizing the electromagnetic coil with a second current polarity that generates a fourth biasing force, with the fourth biasing force being substantially opposite to the second biasing force of the plurality of permanent magnets and substantially in alignment with the first biasing force of the biasing device, wherein the fourth biasing force in combination with the first biasing force overcomes the second biasing force and moves the armature to unblock a third port and to block the first port.

* * * * *